United States Patent [19]
Wattron et al.

[11] Patent Number: 5,594,974
[45] Date of Patent: Jan. 21, 1997

[54] RELEASABLE CASTER

[75] Inventors: James Wattron, Gurnee; Walter E. Lisowski, Chicago, both of Ill.

[73] Assignee: James P. Wattron, Gurnee, Ill.

[21] Appl. No.: 292,860

[22] Filed: Aug. 19, 1994

Related U.S. Application Data

[63] Continuation-in-part of Ser. No. 12,728, Feb. 3, 1993, Pat. No. 5,347,681.

[51] Int. Cl.⁶ .............................. A63C 17/01; B60B 33/00
[52] U.S. Cl. .................. 16/30; 16/38; 280/11.27; 280/87.042
[58] Field of Search .................... 16/30, 38, 39; 280/11.27, 87.042, 11.19; 81/177.85; 403/380, DIG. 6

[56] References Cited

U.S. PATENT DOCUMENTS

| | | | |
|---|---|---|---|
| 162,433 | 4/1875 | Thinnes | 16/38 |
| 438,506 | 10/1890 | Thinnes | 16/38 |
| 1,461,767 | 7/1923 | Weyrauch | 16/39 |
| 2,430,737 | 11/1947 | Roe | 16/39 |
| 2,520,375 | 8/1950 | Roe | 16/39 |
| 4,198,080 | 4/1980 | Carpenter | 403/DIG. 6 |
| 4,317,392 | 3/1982 | Stephens et al. | 81/177.85 |
| 4,636,135 | 1/1987 | Bancon | 81/177.85 |
| 4,655,655 | 4/1987 | Schurfeld | 403/380 |
| 4,848,196 | 7/1989 | Roberts | 81/177.85 |
| 4,938,622 | 7/1990 | Stoerzbach | 403/380 |
| 5,221,111 | 6/1993 | Younger | 280/87.042 |

FOREIGN PATENT DOCUMENTS

| | | | |
|---|---|---|---|
| 189894 | 2/1938 | Switzerland | 280/11.27 |
| 3264 | of 1886 | United Kingdom | 16/38 |

*Primary Examiner*—M. Rachuba
*Assistant Examiner*—Donald M. Gurley
*Attorney, Agent, or Firm*—Leydig, Voit & Mayer, Ltd.

[57] ABSTRACT

A releasable caster for use with a moveable structure having a bottom wall wherein the caster has a swivel connected yoke and stem with the yoke supporting a plastic wheel. The stem includes a manually operable spring biased rod that has an indentation between its ends and co-acts with a ball detent. A shell with a flange at its outer end is adapted to be received in an opening in the wall. The shell has an abutment, preferably in the form of a groove with the upper edge forming an abutment which copperatively locks the ball detent or releases the ball when the rod is moved longitudinally or rotationally.

9 Claims, 4 Drawing Sheets

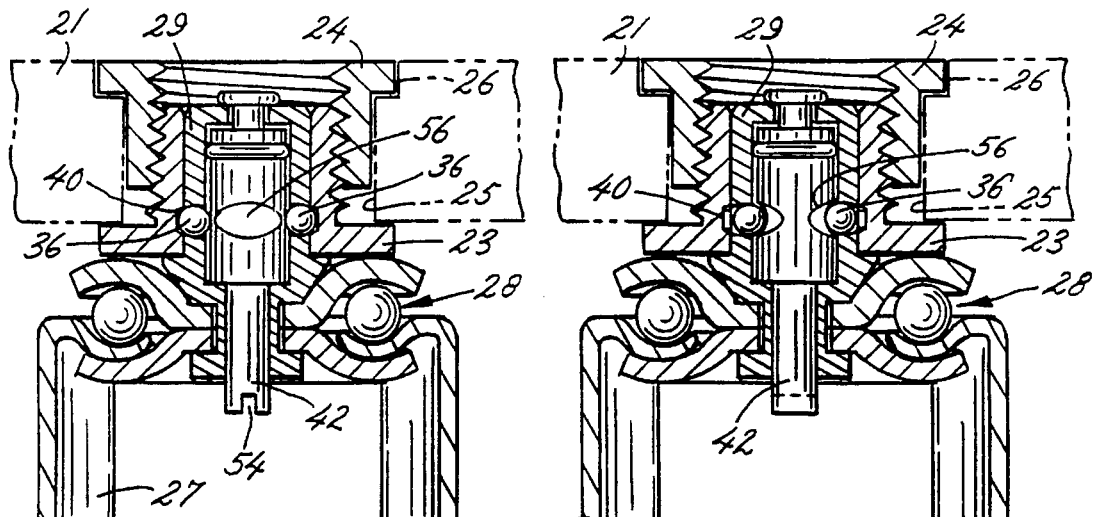
FIG. 6    FIG. 7
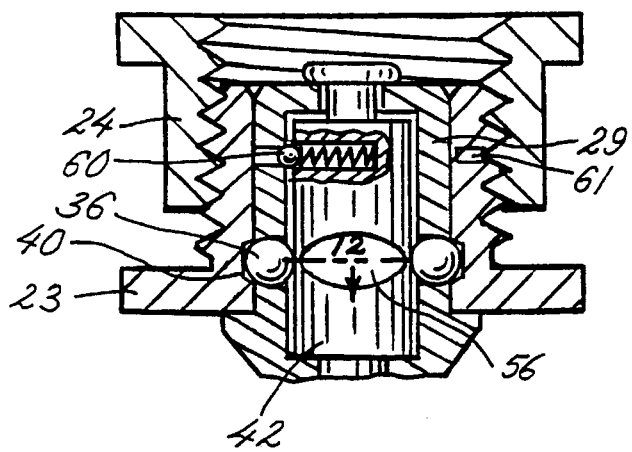
FIG. 8
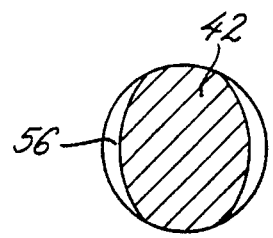 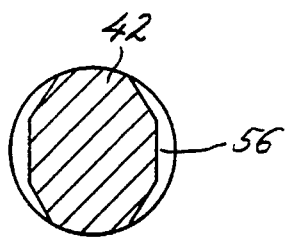
FIG. 9    FIG. 10

5,594,974

RELEASABLE CASTER

RELATED APPLICATION

This is a continuation-in-part to our U.S. application Ser. No. 08/012,728, filed Feb. 3, 1993 on "Releasable Fifth Wheel Caster For Skateboards", now U.S. Pat. No. 5,347,681 issued Sep. 20, 1994.

FIELD OF THE INVENTION

The present invention relates generally to casters, and more particularly, to a quick releasable caster which may be affixed to moveable structures.

BACKGROUND OF THE INVENTION

In our aforementioned application we provided a fifth wheel caster apparatus with an easy releasable attachment mechanism particularly suited to be simply and easily installed on the upwardly sloping tail end of a skateboard and minimizes the time and effort to install or release the caster wheel while maintaining the integrity of the skateboard. The caster arrangement, however, is more widely useful and adaptable for use with a widely diverse range of moveable structures.

SUMMARY OF THE INVENTION

In accomplishing this and other objects of the invention, there is provided a caster with swivel connected yoke and stem. The yoke carries a wear resistant plastic wheel such as those made of polyurethane materials. Included in the stem is a rod means that can be moved either longitudinally or rotationally with respect to the stem. The rod means has an indentation means which acts in conjunction with a ball detent either holding the ball radially outward or allowing the ball to move radially inward to the rod indentation. A mounting shell or T-nut is received in an opening provided in the support structure and the shell has an abutment groove or surface defined by its internal wall.

The caster stem is insertable from the bottom into the shell and either pushing the rod means preferably from the underside of the yoke or otherwise moving the rod means from a first position releases the ball detent to allow a telescoped fit and when the rod means is moved to a second position the ball detent is positively seated against the shell abutment means fixedly attaching the caster to the structure. Reversal of the procedure, that is, pushing or moving the rod means releases the ball detent and allows the caster to be simply removed from the structure.

BRIEF DESCRIPTION OF THE DRAWINGS

FIG. 6 is an enlarged partial section here showing an alternative twist release mechanism in the secure position;

FIG. 7 is an enlarged partial section similar to FIG. 6 here showing the release position;

FIG. 8 is an enlarged partial section of the structure of FIGS. 6 and 7, including an additional position locating detent;

FIG. 9 is a section taken along the line 9—9 in FIG. 8, showing one cross-sectional cam profile;

FIG. 10 is a section view similar to FIG. 9 here showing an alternative cam profile with detent flats;

Figure 1:
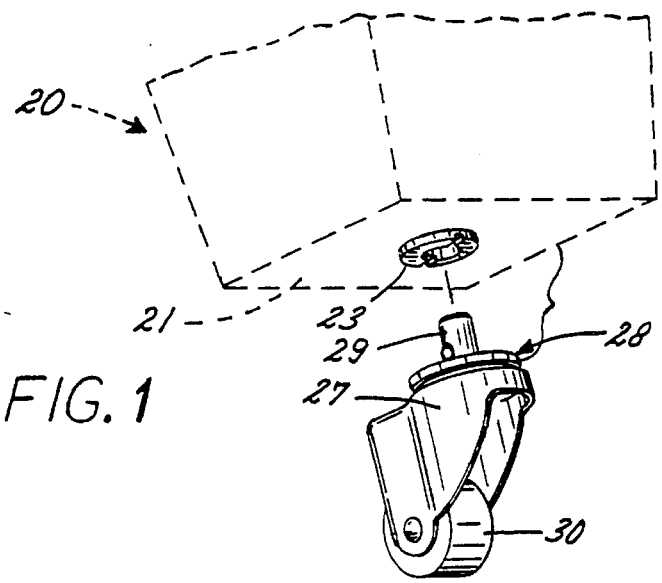
FIG. 1 is a partial rear side perspective view of an illustrative structure shown in phantom with the present invention positionable thereon.

While the invention is susceptible to various alternative forms and modifications, specific embodiments thereof have been shown by way of example in the drawings and will herein be described in detail. It should be clear, however, that it is not intended to limit the invention to the particular forms disclosed, but on the contrary, the intention is to cover all modifications, equivalents, and alternatives falling within the scope and spirit of the invention as described in detail herein.

DETAILED DESCRIPTION OF THE INVENTION

Referring to the drawings, in particular, FIG. 1 illustrates an exemplary embodiment of the invention when used in connection with a structure generally indicated at 20.

In the illustrative embodiment in FIG. 1, the wall portion 21 carries a flanged receiving sleeve 23 which is fixed together with a similar flanged receiving sleeve 24 (FIG. 2) that fit within a hole 25 provided in the bottom wall.

Figures 2, 3:
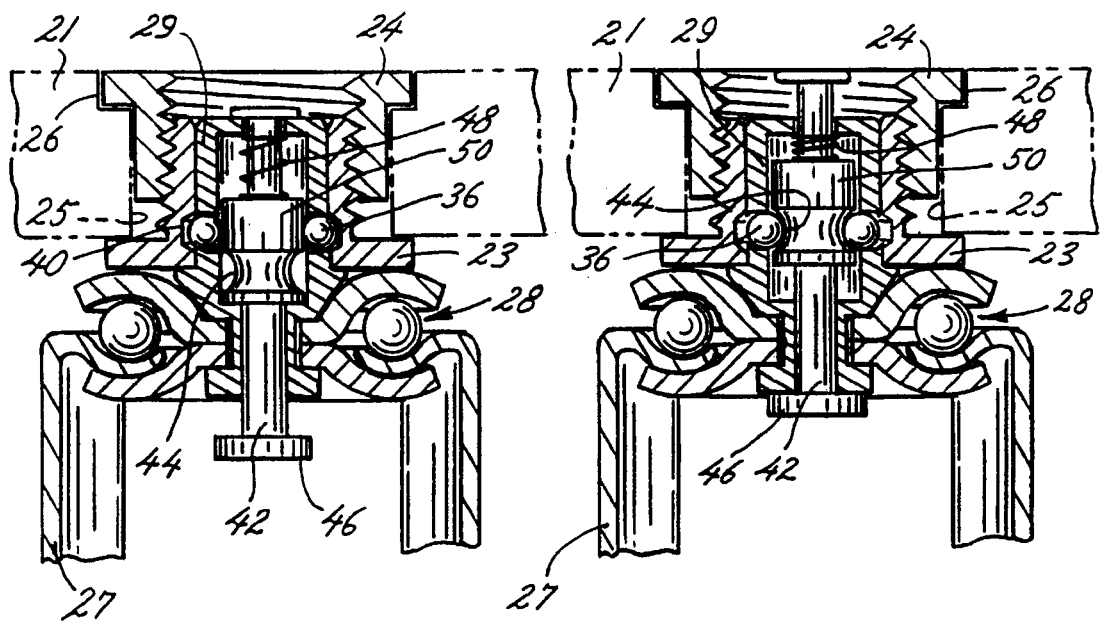
FIG. 2 is an enlarged partial section here showing a bottom actuated push-button release mechanism in the secure position.
FIG. 3 is an enlarged section similar to FIG. 2 here showing the release position.

As best shown in FIGS. 2 and 3, the flanged sleeves 23 and 24 are in the form of respective outer threaded and inner threaded shells which can be inserted in opening 25 through opposite sides of the wall 21 and threadably engaged together to firmly affix them to the wall. A counter bore 26 in opening 25 may be provided at the top so that the upper shell flange is seated evenly with the top surface of the wall.

In accordance with the present invention there is provided a caster having a wheel supporting yoke 27 connected with a ball bearing swivel 28 to a stem 29. The yoke 27 carries a wear resistant plastic wheel 30 such as those made of polyurethane materials.

Referring now to FIGS. 2 and 3, the caster stem means 29 carries a pair of radially movable balls 36 which act with groove 40 on shell 23, but with the rod means 42 here being in the form of a plunger having a grooved portion 44 intermediate its ends and a push-button head 46 at the lower end and a spring 48 at the upper end normally spring biases the rod means 42 downwardly. As shown in FIG. 2, the cylindrical portion 50 above the groove 44 of rod means 42 keeps the balls 36 radially outwardly engaged with the inner wall edge of groove 40 which locks the stem 29 in place, holding the caster to the wall. As shown in FIG. 3, when the rod means is pushed upwardly against the spring 48, the grooved portion 44 of rod means 42 allows the balls 36 to move radially inward thereby releasing the stem means 29 for removal of the caster.

Figure 4:
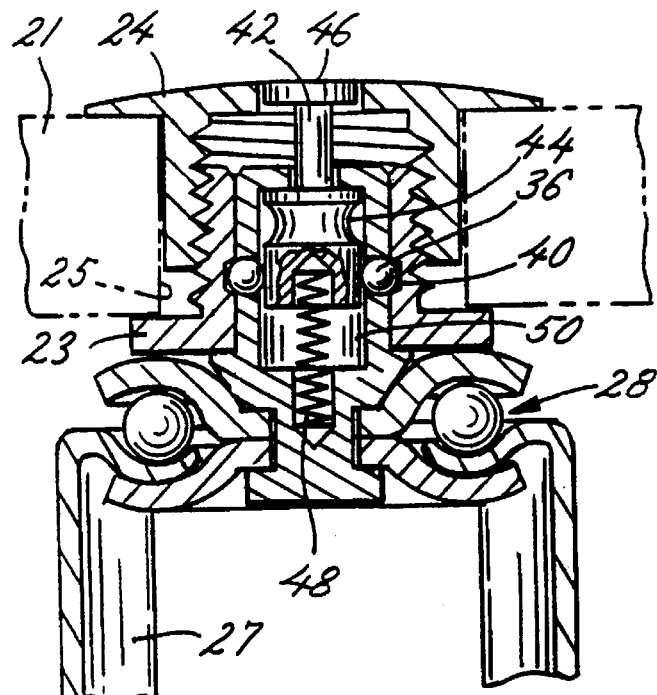
FIG. 4 is an enlarged partial section here showing an alternative push-button from the top in the secure position.
Figure 5:
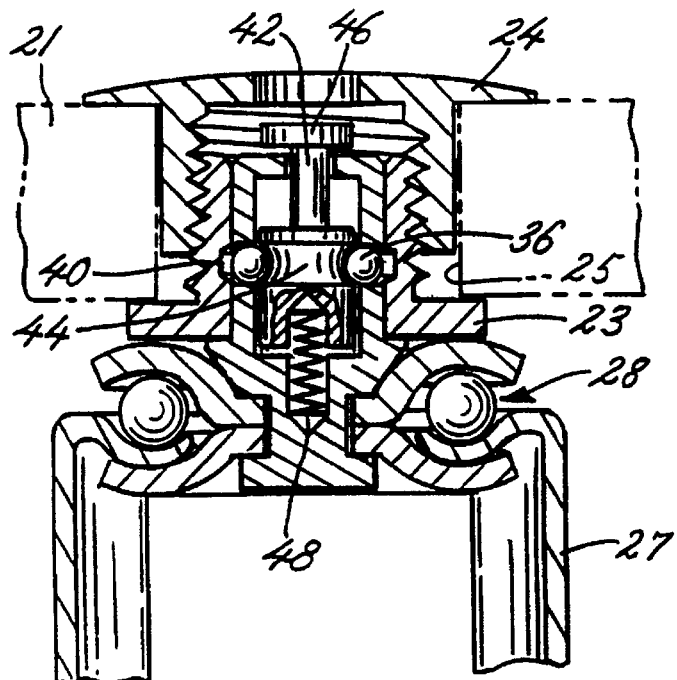
FIG. 5 is an enlarged partial section similar to FIG. 4 here showing the release position.

Turning now to FIGS. 4 and 5, an alternative arrangement is shown which is essentially the opposite of FIGS. 5 and 6 in that the rod means 42 push-button end 46 is at the top side and the grooved portion 44 and cylindrical portion 50 are likewise reversed. Also, the spring 48 is now at the lower end so that the push-button end 46 depressed from the top side releases the balls 36 so that the caster stem can be removed from the shells. Here, the upper flange of the top shell 24 has a tapered surface to confine the push-button 46 and assist in preventing inadvertent depression.

In yet another embodiment illustrated in FIGS. 6 and 7, rod means 42 projects downwardly and has a slotted end 54. Adjacent the radially movable balls 36 is a cylindrical portion and a grooved portion 56 on the surface of the rod means 42. Here, turning the rod means 42 so that the cylindrical portion engages the balls 36 will hold the balls 36 radially outward in the groove 40 particularly the edge on the inner wall of the shell 23. As viewed in FIG. 7 when the rod means 42 is turned so that the grooved portions 56 are aligned with the balls 36, the latter can move radially inward and release the stem 29 with the attendant caster assembly. Referring to FIG. 8, there is shown a slightly modified arrangement such as in FIGS. 6 and 7, but with the addition of a staked ball spring biased detent 60 which in the present instance will indicate the locked-in place position of the turned rod means 42.

In order to insure that the sleeves 23, 24 do not come apart in use, a Nylon plug on patch 61 can be applied to either of the threaded surfaces. Alternatively, a U-shaped wedge can be cut in one or both of the flange edges and a pin or screw applied to arrest rotation. Liquid type sealants, like Thread-Loc can also be applied before screwing the parts together. In FIG. 9 there is shown a cross section of the rod means 42 indicating the grooved portion 56 which permits the radial inward movement of the balls 36. In FIG. 10, the grooved portion 56 is provided with lands including a flat at the central portion that provide a form of detent which does more positively indicate the unlocked turned position of the rod means 42.

Figure 11:
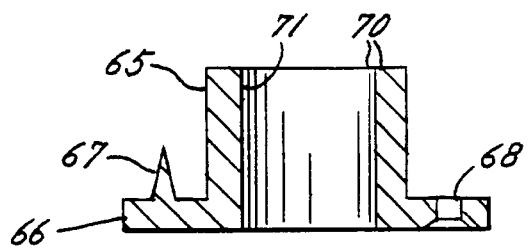
FIG. 11 is a sectional view of an alternative mounting shell with stakes or holes for mounting from one side.
Figure 12:
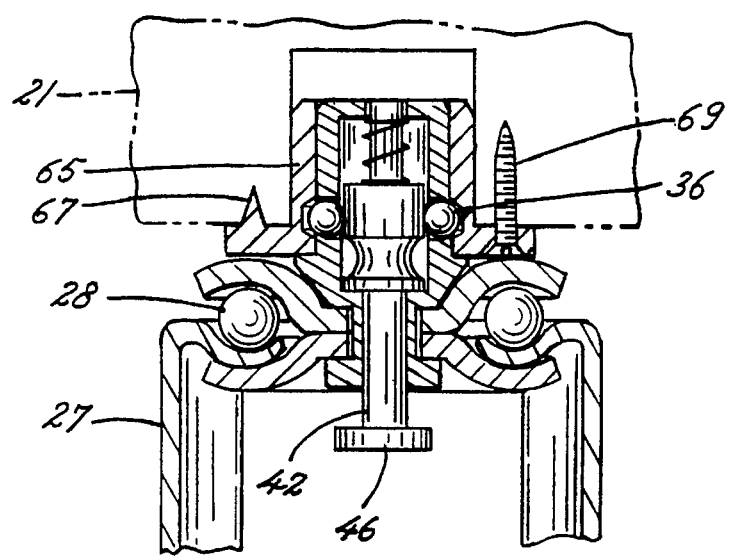
FIG. 12 is an enlarged partial section here showing an alternative mounting.

Turning to FIG. 11, there is shown a T-shell 65 which may be used for one sided holding of the caster instead of having a pair of shells. For illustration purposes, the shell 65 has a flange 66 and on one side there is shown a formed stake 67 while on the other side there is shown a hole 68 for receiving a screw 69 (FIG. 12).

Figure 13:
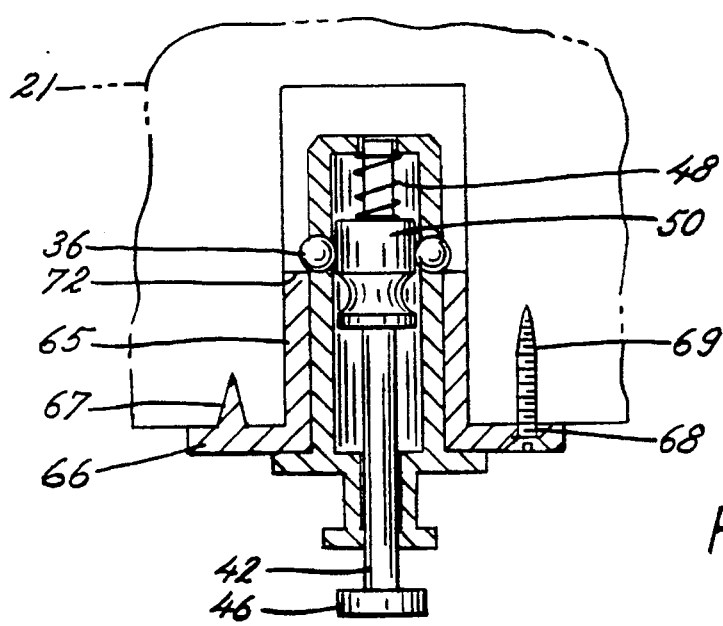
FIG. 13 is an enlarged section similar to FIG. 12, here showing yet another mounting arrangement.

Referring to FIG. 13, there is shown a further alternative where the T-shell 65 is made somewhat longer and provided with an internal groove 72 providing the inner wall edge which will coact with the stem carried balls 36 similar to the embodiment of FIGS. 2 and 3 where two sided interfitting shells 23,24 were used.

As shown in FIG. 13, the balls 36 carried in the caster stem and operated by the plunger 42 will coact with the upper edge 70 of the inner wall 71 of shell 65 to hold the caster in place.

As can be seen from the foregoing detailed description, the releasable caster assembly is extremely simple and economical to manufacture and use and can be adapted in a variety of ways to provide a moveable structure with easy insertion and removal of casters.

It should be apparent to those skilled in the art that changes may be made in the shapes, dimensions and arrangements of the parts of the invention without departing from the principle thereof, the above setting forth only preferred forms of the invention.

We claim:

1. A releasable caster for use with a structure having a bottom wall portion, the bottom wall portion having a hole therein, the releasable caster comprising:

caster means including a wheel, a support yoke, a swivel, and a mounting stem, the mounting stem having a generally axial orifice formed therein and a plurality of radial openings formed therethrough;

a mounting shell adapted to be mounted in the hole of the bottom wall portion of the structure, the mounting shell having an axial opening which releasibly receives the mounting stem, the axial opening having an inner wall, the inner wall having an annular abutment formed therein;

radially moveable balls carried by the radial openings of the mounting stem and positioned opposite the abutment of the inner wall, the balls movable between a first radial position wherein the balls engage the abutment of the inner wall and prevent the mounting stem from being withdrawn from the axial opening of the mounting shell and a second radial position wherein the balls are spaced apart from the abutment of the inner wall and permit the mounting stem to be withdrawn from the axial opening of the mounting shell; and manually operable means arranged in the axial orifice of the mounting stem for moving the balls between the first and second radial positions.

2. A releasable caster as claimed in claim 1, wherein the manually operable means comprises a spring biased rod which is normally biased downwardly within the axial orifice of the mounting stem and is operable from the underside of the support yoke.

3. A releasable caster as claimed in claim 1, wherein the mounting shell comprises a first outer shell and a second inner shell, the first and second shells adapted to be mounted together and each including top surfaces.

4. A releasable caster as claimed in claim 3, wherein the manually operable means comprises a spring biased rod which is normally biased upwardly within the axial orifice of the mounting stem and is operable from the top surface of one of the mounting shells.

5. A releasable caster as claimed in claim 1, wherein the mounting shell comprises a first outer shell and a second inner shell adapted to be mounted together, the second inner shell having a groove formed therein which includes the abutment.

6. A releasable caster as claimed in claim 5, wherein the manually operable means comprises a spring biased rod which radially moves the balls to selectively engage or disengage the groove of the second shell when the rod is manually shifted.

7. A releasable caster as claimed in claim 4, wherein the first and second shells have flanges at their respective ends and include inner and outer threaded surfaces for threadably engaging one another.

8. A releasable caster as claimed in claim 6, wherein the first and second shells have flanges at their respective ends and include inner and outer threaded surfaces for threadably engaging one another.

9. A releasable caster as claimed in claim 1, wherein the manually operable means comprises a rod rotationally twistable within the mounting stem to coact with the radially moveable balls.

* * * * *